(12) United States Patent
Matlack

(10) Patent No.: US 11,628,916 B1
(45) Date of Patent: Apr. 18, 2023

(54) INTEGRATED SYSTEM FOR PRODUCING ELECTRICAL POWER FOR SHIP PROPULSION USING MODULARIZED FUEL STORAGE AND FUEL CONTAINERS

(71) Applicant: Ralph Emerson Matlack, San Jose, CA (US)

(72) Inventor: Ralph Emerson Matlack, San Jose, CA (US)

(73) Assignee: Fourth Tack LLC, San Jose, CA (US)

( * ) Notice: Subject to any disclaimer, the term of this patent is extended or adjusted under 35 U.S.C. 154(b) by 52 days.

(21) Appl. No.: 17/504,143

(22) Filed: Oct. 18, 2021

(51) Int. Cl.
*B63B 79/40* (2020.01)
*B63B 27/12* (2006.01)
*B63B 25/02* (2006.01)

(52) U.S. Cl.
CPC .............. *B63B 79/40* (2020.01); *B63B 25/02* (2013.01); *B63B 27/12* (2013.01)

(58) Field of Classification Search
CPC .......... B63B 79/40; B63B 25/02; B63B 27/12
USPC ................................................ 440/1; 114/72
See application file for complete search history.

(56) References Cited

U.S. PATENT DOCUMENTS 8,062,081 B2 * 11/2011 Barrett ..................... B60K 6/48
440/6
9,550,556 B2 * 1/2017 Kennedy ............... B60L 3/0092

* cited by examiner

*Primary Examiner* — Daniel V Venne
(74) *Attorney, Agent, or Firm* — Plager Schack LLP; Mark H. Plager; Alexis J. Saenz

(57) ABSTRACT

A system and a method produce electrical power for ship propulsion. Power and fuel modules are configured for modular use during travel. The power and fuel modules may be standard freight size containers so that the amount of fuel and power for a trip may be adjusted based on the needs of the trip. A control system may be automated to control loading and unloading of fuel or power modules into the power distribution system, connection or disconnection of fuel or power modules, and adjust distribution of power to the ship's electrical grid based on consumption demands.

20 Claims, 9 Drawing Sheets

Plan View at Tier A

Plan View at Tier B

Plan View at Tier C

Plan View at Tier E

INTEGRATED SYSTEM FOR PRODUCING ELECTRICAL POWER FOR SHIP PROPULSION USING MODULARIZED FUEL STORAGE AND FUEL CONTAINERS

CROSS-REFERENCE TO RELATED APPLICATIONS

None.

BACKGROUND

The present invention relates to power systems, and more specifically, to an integrated system for producing electrical power for ship propulsion using modularized fuel storage and fuel containers.

Decarbonizing the global maritime shipping industry will require a wholesale change in the fuels and powertrains used to generate propulsive and onboard power. This presents a number of challenges and opportunities. First, carbon-free candidate fuels such as hydrogen and ammonia all have different relative advantages and disadvantages depending on the application making a single, industry-wide selection unlikely. Second, all of the carbon-free candidate fuels have a volumetric energy density less than conventional fuels, thus requiring tradeoffs between cargo space or range. Third, the storage method (e.g. compressed gas, cryogenic liquid, metal hydride) for these fuels is subject to innovation and will continue to change over the next decades. Finally, on the power generation side, fuel cells are a likely long term choice but, like the fuels themselves, offer different types (e.g. PEM, SOFC) with different relative advantages and disadvantages depending on the application. In addition, all types of fuel cells are experiencing innovative improvements with respect to their efficiency, operating requirements, durability, and cost. In summary, the common denominator is hydrogen, but there is choice and change in terms of how the hydrogen is carried (fuels) and how it is converted to electrical power (fuel cells).

Existing systems lock ship owners and operators into a fixed configuration for the overall fuel and power system.

SUMMARY

In one aspect of the subject disclosure, a power system for producing electrical power for ship propulsion is disclosed. The system includes a fuel module and a fuel module interface on a ship. The fuel module interface is configured to receive the fuel module. The system also includes a power module and a power module interface to receive the power module. The system also includes a control system connected to the fuel module interface and to the power module interface. The control system is configured to control: flow of a fuel from the fuel module to the power module, conversion of the fuel in the power module to electricity, and regulate a distribution of the electricity from the power module to the ship.

In another aspect of the subject disclosure, a ship is disclosed. The ship includes a ship hold; a plurality of fuel modules stored in the ship hold; and a plurality of fuel module interfaces in the ship hold. Each fuel module interface is configured to receive one of the fuel modules. The ship also includes a plurality of power modules stored in the ship hold and a plurality of power module interfaces on the ship. Each power module interface is configured to receive one of the power modules. The ship also includes a control system connected to the fuel module interfaces and to the power module interfaces. The control system is configured to control: flow of a fuel from the fuel modules to the power modules, conversion of the fuel in the power modules to electricity, and regulate a distribution of the electricity from the power modules to an electrical grid of the ship.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In general, embodiments of the disclosed subject technology disclose an integrated power system for ship propulsion. Aspects of the subject technology allow ship owners and operators to optimize the overall fuel and power system at a ship, a route, or even a voyage leg level. For example, a 20 fuel module configuration might be used on a short voyage leg, then scaled up to 100 modules for the next leg. In this case, 80 additional cargo containers could be carried on the shorter leg. Similarly, the overall performance profile of the ship can be easily changed should the need arise. For example, as long as the installed propulsor motors allowed for it, a ship may be easily reconfigured from a low performance configuration of 10 MW PEM fuel cells with compressed hydrogen fuel modules to a high performance configuration of 20 MW SOFC fuel cells with metal hydride fuel modules.

Current fuel cell-based power systems for ships take a traditional fixed system approach, where the primary power generation equipment (fuel cells) and the fuel storage is intended to be built integral to the ship and not easily changed. This system enables flexibility in two dimensions. First, it allows fuel and power modules to be easily reconfigured using existing cargo handling infrastructure. Second, it allows flexible mixing and matching of fuel, power, and cargo, enabling optimization across a range of situations and applications.

As will be appreciated, the subject technology solves two key problems. First, it extracts the fuel and fuel storage technology from the fuel cell technology, creating flexibility on both sides. Second, by leveraging the standard cargo container form factor it creates the opportunity to make fuel capacity fungible with cargo capacity, allowing tradeoffs between fuel capacity and cargo capacity to be made dynamically on a journey by journey basis.

Definition: "Module": A "module" as referenced below with respect to various elements, in one sense, should be understood to mean a hardware unit configured to interface with a docking element in the system and be replaceable on need, with other similar modules.

Modules may be moved around from one docking slot to another slot on the ship to provide more fuel or power or to make room for cargo. In that sense, elements of the subject technology may sometimes be described as "modular'. Some of the "modules" of the subject technology may provide fuel or power to the rest of the system of ship and may be depleted of their content. Accordingly, when depleted, in one aspect, a module may be replaced by another module or refilled as needed. In an exemplary embodiment, the "modules" of the subject technology may be configured generally as cargo containers which will provide compatibility with the cargo carrying aspects of current vessels.

Figure 1:
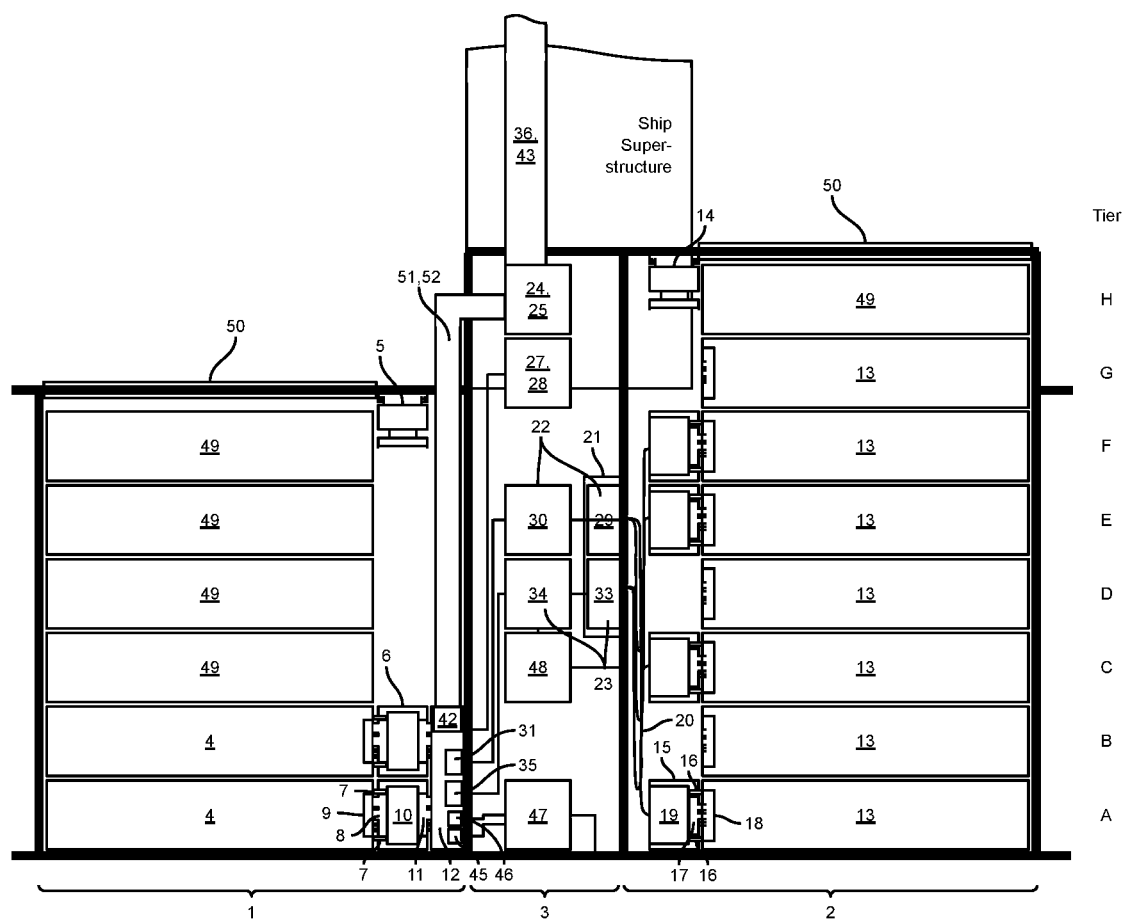
FIG. 1 is a side, plan view of a ship with an integrated propulsion system in accordance with embodiments.
Figure 2:
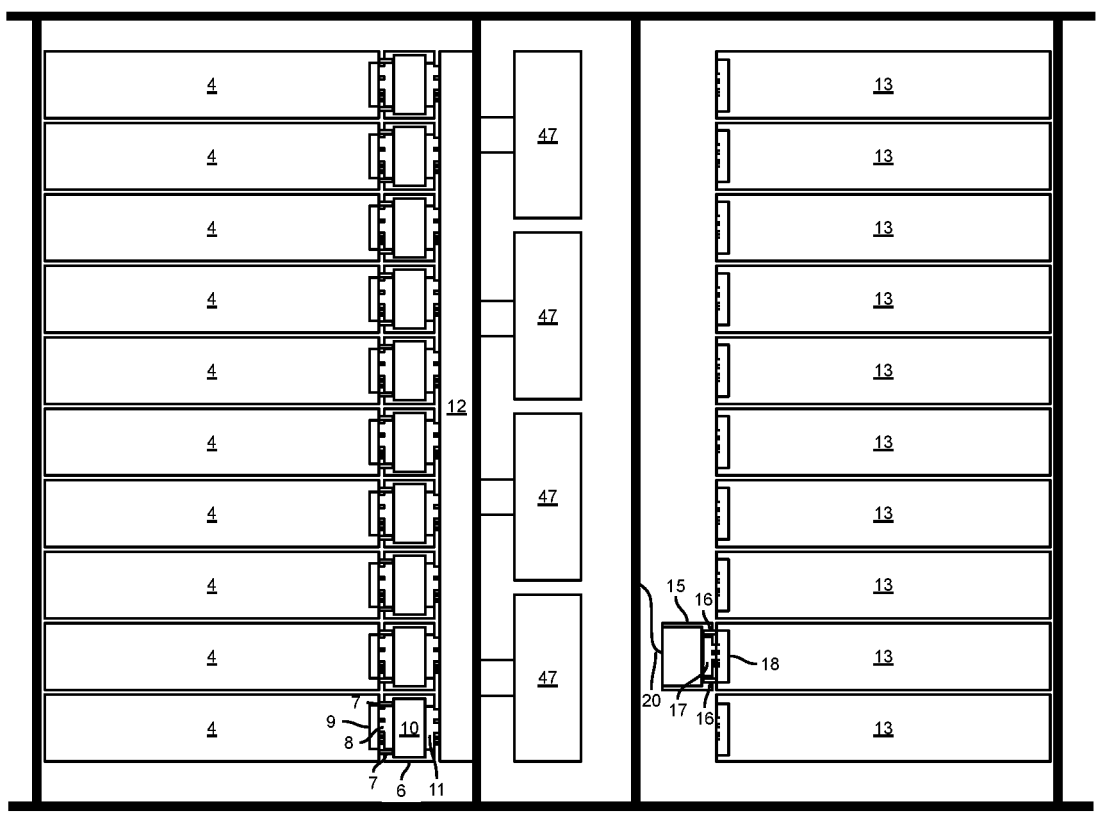
FIG. 2 is a top plan view of tier A of the ship of FIG. 1 in accordance with embodiments.
Figure 3:
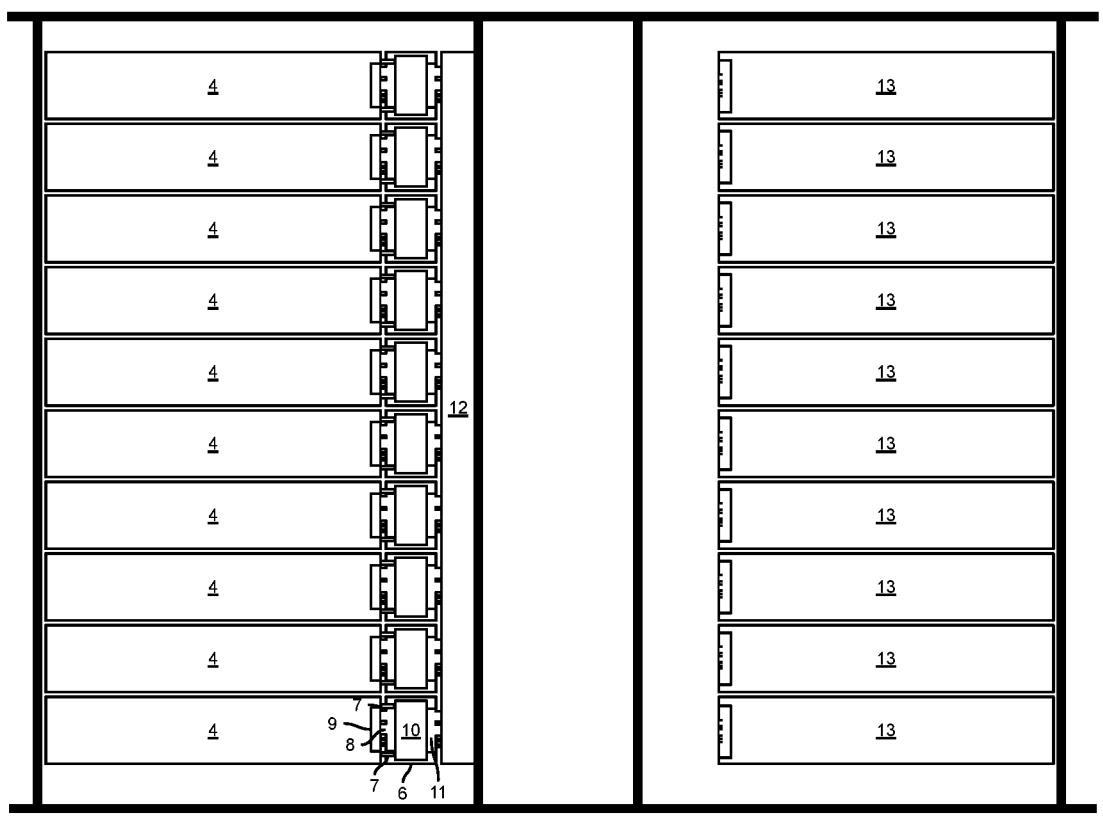
FIG. 3 is a top plan view of tier B of the ship of FIG. 1 in accordance with embodiments.
Figure 4:
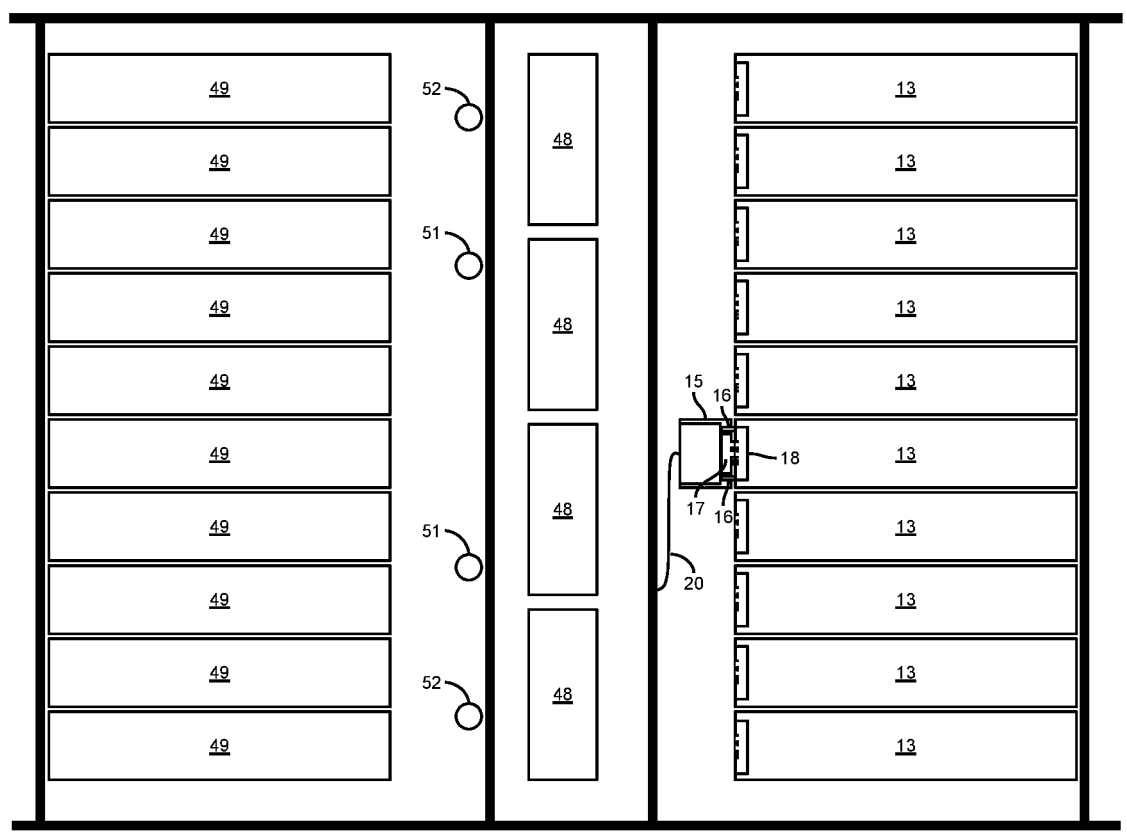
FIG. 4 is a top plan view of tier C of the ship of FIG. 1 in accordance with embodiments.
Figure 5:
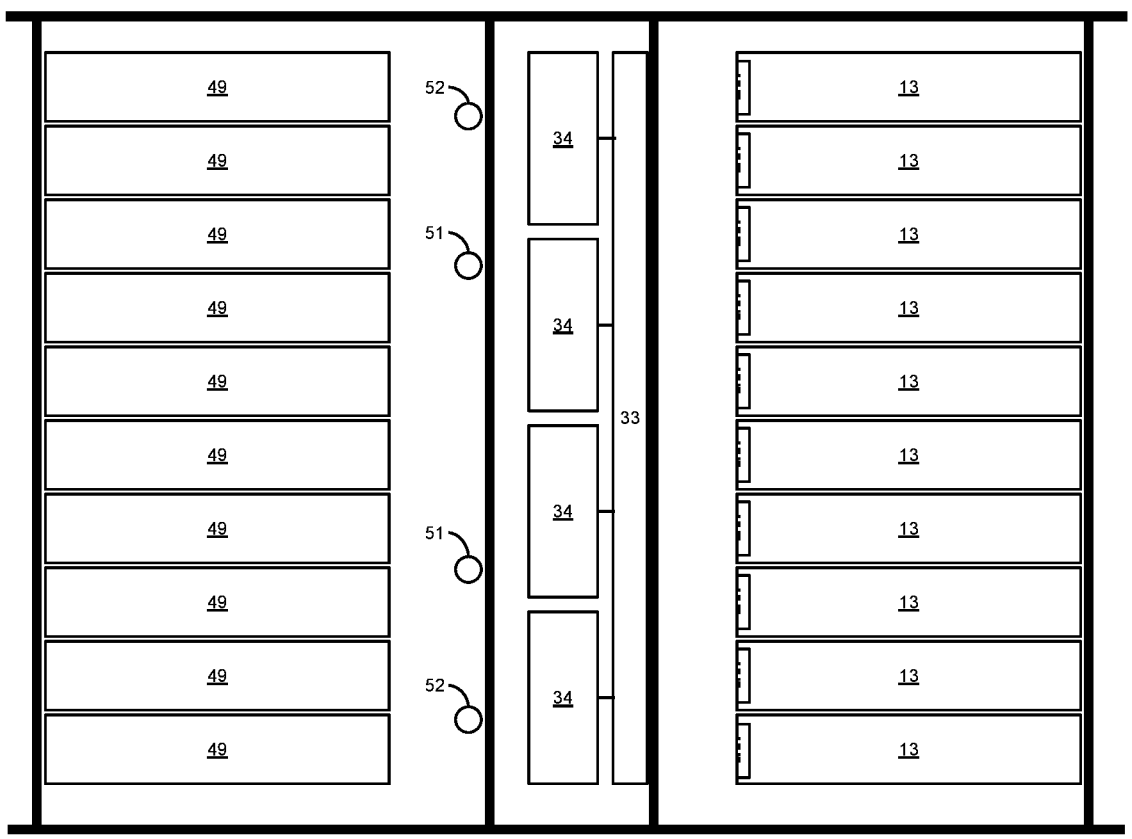
FIG. 5 is a top plan view of tier D of the ship of FIG. 1 in accordance with embodiments.
Figure 6:
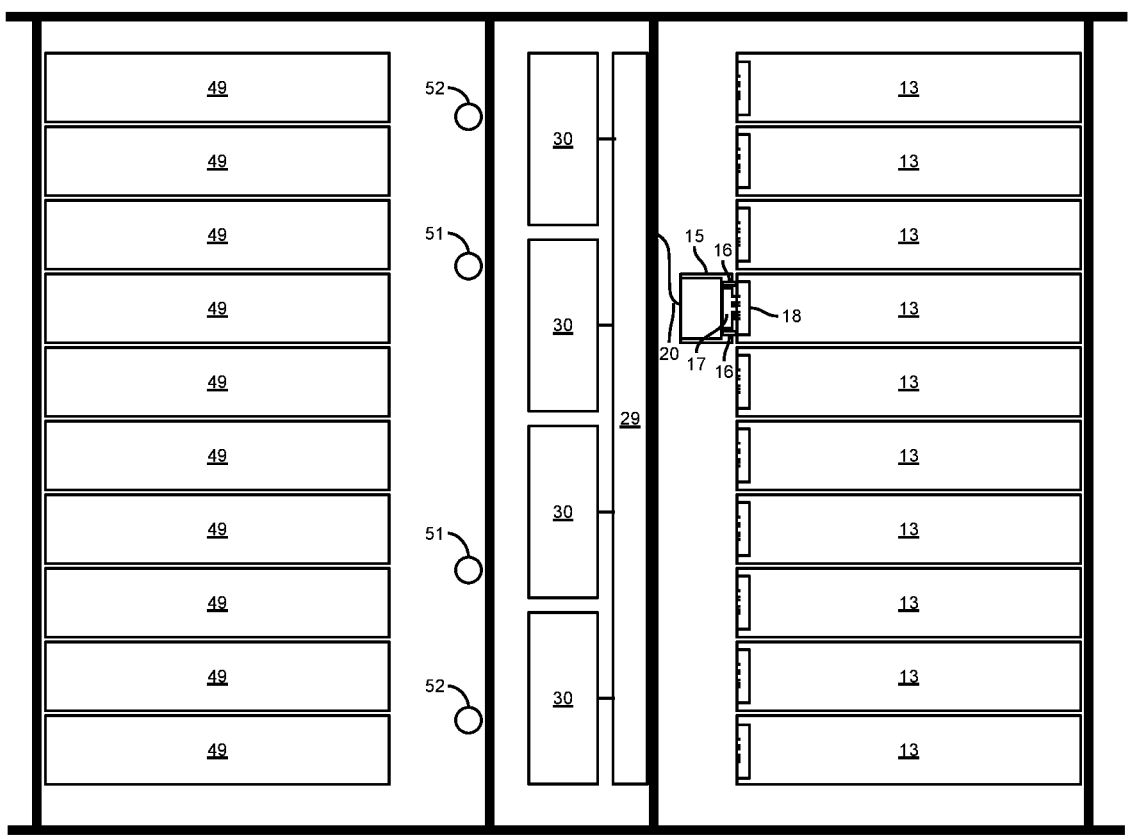
FIG. 6 is a top plan view of tier E of the ship of FIG. 1 in accordance with embodiments.
Figure 7:
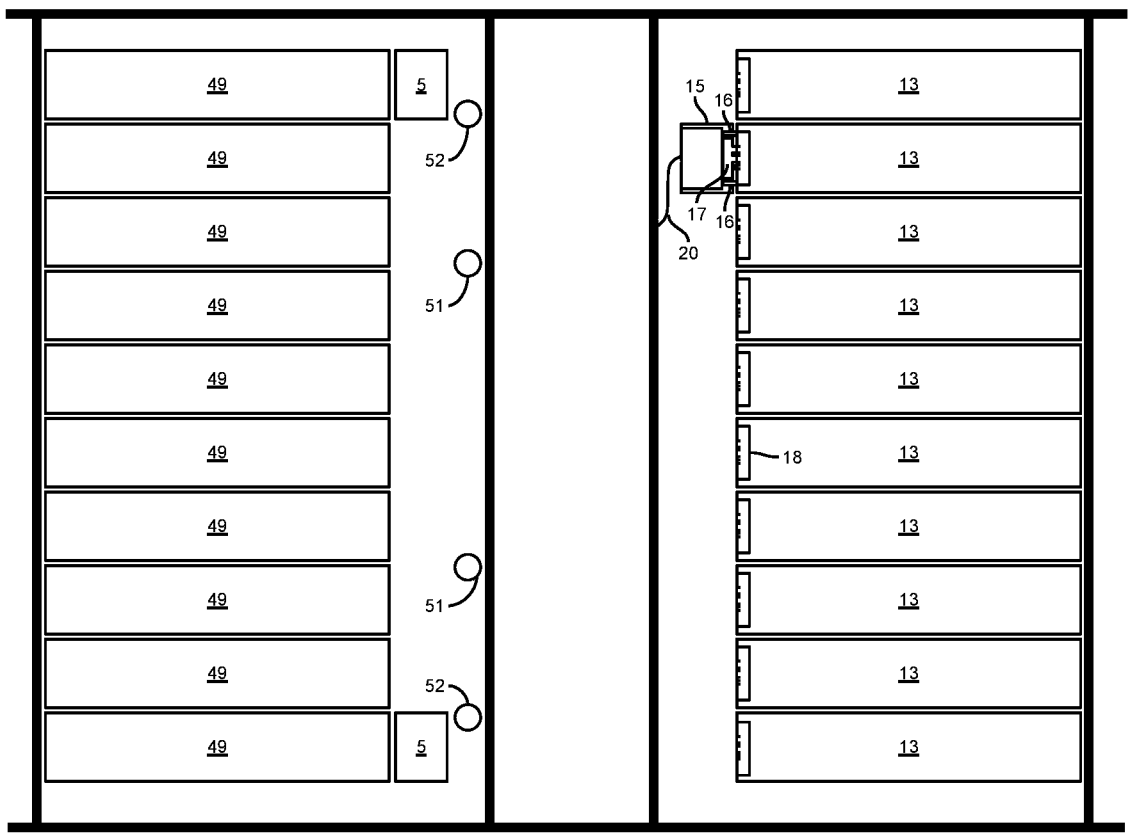
FIG. 7 is a top plan view of tier F of the ship of FIG. 1 in accordance with embodiments.
Figure 8:
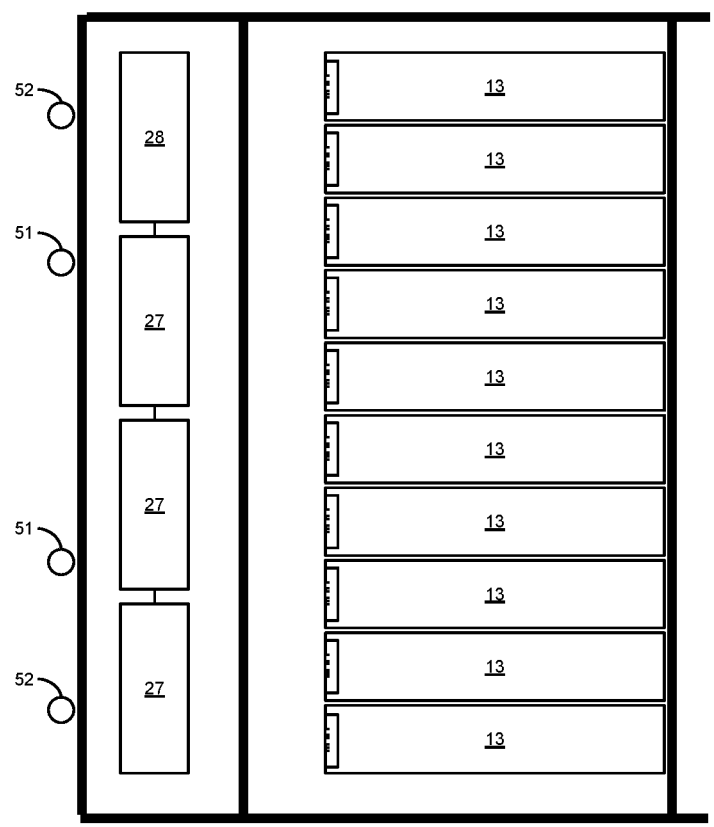
FIG. 8 is a top plan view of tier G of the ship of FIG. 1 in accordance with embodiments.

In the description below, a ship superstructure is described and shown in the drawings by tier levels. FIG. 1 shows an overall view of the subject technology by tier level. The tiers are then shown in the subsequent figures starting from the lowest tier A to the highest tier, which in the exemplary embodiment is tier H. Accordingly, tier "H" is the eighth level of the ship in the embodiment shown. As will be understood, embodiments may have more or less levels than what is shown. In addition, for sake of illustration, some of the elements providing connection to/from a power module or fuel source to other elements may only be called out once in some of the figures to avoid overcrowding of the drawings. However, as can be seen, there presence may exist multiple times on each tier depending on how many power or fuel modules are present.

In reference to the Figures in general, embodiments of the subject system include the following elements, called out by number in parenthesis:

(1): Power Section containing equipment that produce or deliver unconditioned electrical power.

(2): Fuel Section containing modular tanks and equipment that store and supply fuel.

(3): Control Section containing the equipment that processes inputs from the Fuel Modules, supplies Power Modules with reactants and coolant, supplies conditioned electrical power for end use, and controls the overall system.

(4): Power Module containing a fuel cell array or battery array in a container structure that conforms to standard freight container dimensions.

(5): Power-side Gantry consisting of a gantry-type lifting device capable of positioning Power Module Connection Heads vertically and horizontally.

(6): Power Module Connection Head consisting of a moveable metal framework with attachment points on the top for vertical lifting and equipment for connecting Power Modules to the Supply Manifold Assembly.

(7): Power Module Connection Head Clamps consisting of an automated robotic clamping mechanism.

(8): Power Module Connection Head Interface consisting of an automated robotic mechanism with cables, hoses, valves, and couplings matching the connections on the Power Module Interface.

(9): Power Module Interface consisting of the necessary connections to operate the module (for example, reactant input, exhaust output, power output, control connection).

(10): Power Module Connection Head Processor consisting of equipment to optimize the properties (for example, temperature, pressure, humidity) of reactants from the Supply Manifold Assembly prior to their input into a Power Module.

(11): Power-side Hose and Cable Assembly consisting of hoses and electrical cables with sufficient length and flexibility to connect the Power Module Connection Head to a connection point on the Supply Manifold Assembly.

(12): Supply Manifold Assembly consisting of equipment for distributing reactants and coolant to Power Modules and receiving exhaust products, coolant, and electrical power from Power Modules.

(13): Fuel Module containing a hydrogen-carrying substance in a containment vessel and supporting structure that conforms to standard freight container dimensions.

(14): Fuel-side Gantry consisting of a gantry-type lifting device capable of positioning Fuel Module Connection Heads vertically and able to position itself laterally across the breadth of the ship.

(15): Fuel Module Connection Head consisting of a moveable metal framework with attachment points on the top for vertical lifting and equipment for connecting Fuel Modules to the Fuel Input Manifold Assembly.

(16): Fuel Module Connection Head Clamps consisting of an automated robotic clamping mechanism.

(17): Fuel Module Connection Head Interface consisting of an automated robotic mechanism with cables, hoses, valves, and couplings matching the connections on the Fuel Module Interface.

(18): Fuel Module Interface consisting of the necessary connections to transfer fuel to and from the Fuel Module.

(19): Fuel Module Connection Head Processor consisting of equipment to change the properties of fuel received from Fuel Modules to levels that the Fuel Input Manifold Assembly supports (for example, gasification of liquid hydrogen).

(20): Fuel-side Hose and Cable Assembly consisting of hoses and electrical cables with sufficient length and flexibility to connect the Intermediate Manifold to all Fuel Module locations.

(21): Fuel Input Manifold Assembly consisting of equipment for aggregating fuel from Fuel Modules and routing it to subsystems within the Control Section.

(22): Hydrogen Supply Subsystem consisting of equipment to manage the flow of gaseous hydrogen from the Fuel Modules to the Power Modules.

(23): Ammonia Supply Subsystem consisting of equipment to manage the flow of liquid ammonia from the Fuel Modules to the Power Modules.

(24): Air Supply Subsystem consisting of equipment to manage the flow of air from the atmosphere to the Power Modules.

(25): Exhaust Subsystem consisting of equipment to manage the flow of exhaust gases from the Fuel Modules to the atmosphere.

(26): Cooling Subsystem consisting of equipment to manage the flow and temperature of a coolant fluid to and from the Power Modules.

(27): Electrical Subsystem consisting of equipment to condition electrical current from the Power Modules for use by the vessel's electrical grid.

(28): Master Control Subsystem consisting of equipment and software to monitor and control all aspects of the system.

(29): Hydrogen Fuel Input Manifold consisting of equipment for aggregating gaseous hydrogen fuel from Fuel Modules.
(30): Hydrogen Buffer Storage System consisting of equipment to pressurize and store gaseous hydrogen.
(31): Hydrogen Supply Manifold consisting of equipment for distributing gaseous hydrogen to Power Modules via Power Module Connection Heads.
(32): Waste Heat Recovery System consisting of equipment to convert heat from exhaust gas into steam or power.
(33): Ammonia Fuel Input Manifold consisting of equipment for aggregating liquid ammonia fuel from Fuel Modules.
(34): Ammonia Buffer Storage System consisting of equipment to store liquid ammonia.
(35): Ammonia Supply Manifold consisting of equipment for distributing liquid ammonia to Power Modules via Power Module Connection Heads.
(36): Intake Stack consisting of ducts for intaking and routing atmospheric air from outside the vessel to inside the vessel.
(37): Intake Air Blowers
(38): Intake Air Filters
(39): Intake Air Compressor
(40): Compressed Air Buffer Storage System consisting of equipment to pressurize and store air.
(41): Compressed Air Supply Manifold consisting of equipment for distributing pressurized air to Power Modules via Power Module Connection Heads.
(42): Exhaust Manifold consisting of equipment for aggregating exhaust gases from Power Modules.
(43): Exhaust Stack consisting of ducts for routing and expelling exhaust gases from inside the vessel to the outside environment.
(44): Exhaust Gas Heat Exchanger consisting of equipment for transferring heat from exhaust gases to the working fluid of another system aboard the vessel (for example, service steam, water, secondary power generation).
(45): Low Temperature Coolant Fluid Manifold consisting of equipment for distributing low temperature coolant fluid to Power Modules via Power Module Connection Heads.
(46): High Temperature Coolant Manifold consisting of equipment for aggregating high temperature coolant fluid from Power Modules.
(47): Cooling Unit consisting of equipment for lowering the temperature of coolant fluid by exchanging heat with water and/or air from the outside environment.
(48): Ammonia Cracking Subsystem consisting of equipment for dissociating liquid ammonia into gaseous hydrogen and nitrogen.
(49): Cargo Containers
(50): Hatch Covers
(51): Exhaust Gas Vents
(52): Intake Air Vents Referring now to FIG. 1, a system for producing electrical power for ship propulsion is shown according to an exemplary embodiment. The overall system comprises three main sections. The power section (1) houses the equipment that produces and delivers unconditioned electrical power. The fuel section (2) houses the tanks and equipment that store and supply fuel. The control section (3) connects the power section (1) to the fuel section (2) and houses the equipment that supplies inputs to the power modules (4), supplies conditioned electrical power for end use, and controls the overall system. Each section is located in its own watertight compartment. The sections (1-4) may be located adjacent to each other, or in a more distributed arrangement.

In an exemplary embodiment, the power modules (4) and/or fuel modules (13) may be the size of standard shipping freight containers (for example, approximately 8 feet wide by 8 to 10 feet high and 8-40 feet in length). In one aspect, the system is generally modular with respect to the power modules (4) and/or fuel modules (13). As will be appreciated, the modularity provides a lot of flexibility in carrying fuel or providing increased power (or less as needed) to the ship while also allowing for flexibility in the amount of cargo containers carried. The power modules (4) and/or fuel modules (13) may be swapped in or out in exchange for freight containers as needed. In some embodiments, the room needed for a fuel hold may be exchanged for the room used for power modules (4) and/or fuel modules (13).

Power modules (4) are positioned and stacked within the power section (1) guided by standard cargo container cell guides. A gantry (5) in the power section (1) may be used to position and align a power module connection head (6) with a power module (4). Power module connection head clamps (7) securely attach the metal framework of the power module connection head (6) to the structure of a power module (4). In an exemplary embodiment, the power module connection head (6) may include a power module connection head interface (8), a power module connection head processor (10), and a power-side hose and cable assembly (11). The aforementioned elements may be built into the metal framework of the power module connection head (6). The power module connection head interface (8) connects the power module connection head processor (10) to the inputs and outputs on a power module interface (9) of the power module (4). The power-side hose and cable assembly (11) connect the power module connection head processor (10) to the supply manifold assembly (12) in the control section (3).

Fuel modules (13) are positioned and stacked within the fuel section (2) guided by standard cargo container cell guides. The fuel-side gantry (14) is used to position and align a fuel module connection head (15) with a fuel module (13). Fuel module connection head clamps (16) securely attach the metal framework of the fuel module connection head (15) to the structure of a fuel module (13). In an exemplary embodiment, the fuel module connection head (15) may include a fuel module connection head interface (17), a fuel module connection head processor (19), and a fuel-side hose and cable assembly (20). The aforementioned elements may be built into the metal framework of the fuel module connection head (15). The fuel module connection head interface (17) connects the fuel module connection head processor (19) to the inputs and outputs on the fuel module interface (18) of the fuel module (13). The fuel-side hose and cable assembly (20) connect the fuel module connection head processor (19) to the fuel input manifold assembly (21) in the control section (3).

The power modules (4) convert the fuel to electricity. The electricity is fed to the ship's grid. The ship's grid is usually connected to large electric motors which turn the propeller shaft. The ship's grid also provides electrical power for other onboard needs such as lights, pumps, bow thrusters, cargo handling equipment, etc. (also known as the "hotel load" in the field).

In an exemplary embodiment, the control section (3) may include seven main subsystems: a hydrogen supply subsystem (22), an ammonia supply subsystem (23), an air supply subsystem (24), an exhaust subsystem (25), a cooling subsystem (26), the electrical subsystem (27), and the master control subsystem (28). The assemblies and components within each of these subsystems may themselves be built as modularized units, and designed to be connected in series or parallel to scale to a particular configuration called for.

Within the hydrogen supply subsystem (22), a hydrogen fuel input manifold (29) within the fuel input manifold assembly (21) accepts gaseous fuel from hydrogen-storing fuel modules (13) via the fuel-side hose and cable assembly (20). The fuel input manifold assembly (21) itself may include modular sub-assemblies connected together to form the full manifold assembly (21). Piping connects the hydrogen fuel input manifold (29) to a hydrogen buffer storage system (30). The hydrogen buffer storage system (30) may be a set of modular storage subsystems connected in parallel by pipes and/or hoses. Piping connects the hydrogen buffer storage system (30) to a hydrogen supply manifold (31) within the supply manifold assembly (12). The hydrogen supply manifold (31) is connected to the power module connection heads (6) via power-side hose and cable assemblies (11). Remotely operated valves are located throughout the subsystem and are connected via cables to the master control subsystem (28).

Within the ammonia supply subsystem (23) the ammonia fuel input manifold (33) accepts liquid fuel from ammonia-storing fuel modules (13) via the fuel-side hose and cable assembly (20). Piping connects the ammonia fuel input manifold (33) to the ammonia buffer storage system (34). Piping connects the ammonia buffer storage system (34) to the ammonia supply manifold (35) within the supply manifold assembly (12). The ammonia supply manifold (35) is connected to the power module connection heads (6) via power-side hose and cable assemblies (11). Remotely operated valves are located throughout the subsystem and are connected via cables to the master control subsystem (28).

Figure 9:
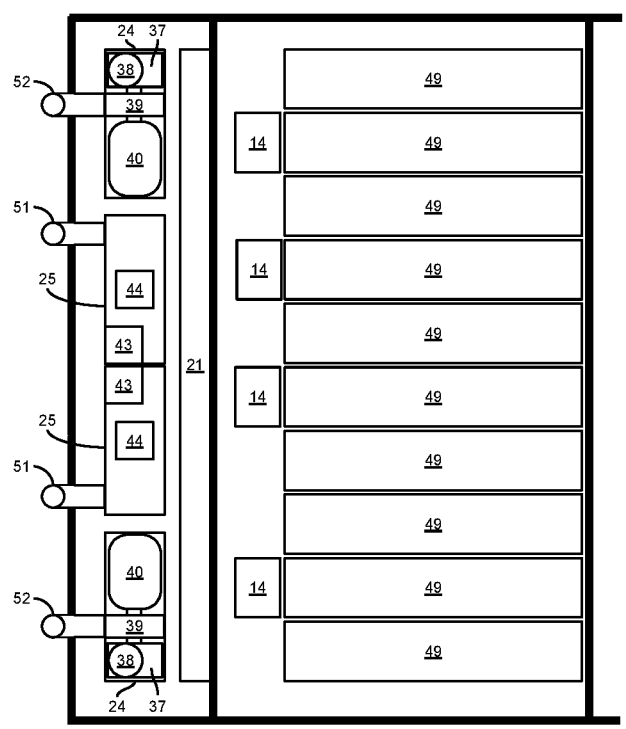
FIG. 9 is a top plan view of tier H of the ship of FIG. 1 in accordance with embodiments.

Referring to FIG. 1 concurrently with FIG. 9, within the air supply subsystem (24), the intake stack (36) accepts air from the environment. Intake air is routed via ducts through intake air blowers (37) (See FIG. 9), through intake air filters (38), into an intake air compressor (39), and into the compressed air buffer storage system (40). Piping connects the compressed air buffer storage system (40) to the compressed air supply manifold (41) within the supply manifold assembly (12). The compressed air supply manifold (41) is connected to the power module connection heads (6) via power-side hose and cable assemblies (11). Remotely operated valves are located throughout the subsystem and are connected via cables to the master control subsystem (28).

Within the exhaust subsystem (25), exhaust gases are routed via hoses from power module connection heads (6) to the exhaust manifold (42). Ducts connect the exhaust manifold (42) to the exhaust stack (43) which expels exhaust gases to the environment. Exhaust gas may pass through an exhaust gas heat exchanger(s) (44) in some embodiments before being expelled to the environment. Remotely operated valves are located throughout the subsystem and are connected via cables to the master control subsystem (28).

Within the cooling subsystem (26), input and output hoses connect the power module connection heads (6) to the low temperature coolant fluid manifold (45) and high temperature coolant manifold (46). Pipes connect the low temperature coolant fluid manifold (45) and high temperature coolant manifold (46) to the cooling unit (46). Water from the environment is routed through pipes into and out of the cooling unit (46). Remotely operated valves are located throughout the subsystem and are connected via cables to the master control subsystem (28).

Cables connect the power module (4) connection heads to the electrical subsystem (27). Cables connect the electrical subsystem (27) to the ship's general electrical grid (not shown).

The master control system (28) is connected to all components of the overall system via wiring. Additional wiring connects the master control system (28) to display and control consoles located elsewhere on the vessel.

Referring now to FIGS. 2-9 (with some reference back to the elements of FIG. 1), a loading configuration of a ship is shown according to an exemplary embodiment. Power modules (4) are loaded into the power section (1) hold. The power section (1) hold is fitted with standard cargo container cell guides, and power modules (4) are loaded via standard shipboard or shoreside container handling gear. A power module connection head (6) is lifted by the power-side gantry (5) and positioned vertically and laterally to align with a power module (4) that is compatible with the connection head's fuel type and capability. Once the power module connection head (6) is aligned with the power module (4), the power module connection head clamps (7) are engaged to lock the power module connection head (6) to the power module (4). With the power module connection head (6) securely attached to the power module (4), the lifting mechanism of the power-side gantry (5) detaches from the power module connection head (6) and is retracted. Once the power module connection head (6) is locked to the power module (4), the power module connection head interface (8) is engaged to automatically connect to the power module interface (9). The process is repeated for as many power modules (4) that are loaded and will be used for the journey. Power modules (4) of various types (for example, SOFC, PEM, battery), capacities, or manufacturer can be loaded in any combination. Empty or laden standard cargo containers may be stacked on top of and/or adjacent to power modules (4) in the power section (1) hold in order to fully utilize the space.

Fuel modules (13) are loaded onto on or more tiers of the ship and into the fuel section (2) hold. The fuel section (2) hold is fitted with standard cargo container cell guides, and fuel modules (13) are loaded via standard shipboard or shoreside container handling gear. A fuel module connection head (15) is lifted by the fuel-side gantry (14) and positioned vertically and laterally to align with a fuel module that is compatible with the connection head's fuel type and capability. Once the fuel module connection head (15) is aligned with the fuel module (13), the fuel module connection head clamps (16) are engaged to lock the fuel module connection head (15) to the fuel module (13). With the fuel module connection head (15) securely attached to the fuel module (13), the lifting mechanism of the fuel-side gantry (14) detaches from the fuel module connection head (15) and is retracted. Once the fuel module connection head (15) is locked to the fuel module (13), the fuel module connection head interface (17) is engaged to automatically connect to the fuel module interface (18). The process is repeated for as many fuel modules (13) as will be connected concurrently during the journey. Fuel modules (13) of various types (for example, gaseous hydrogen, liquid hydrogen, ammonia, metal hydride, liquid organic), capacities, or supplier can be loaded in any combination. Empty or laden standard cargo containers may be stacked on top of and/or adjacent to fuel modules in the fuel section (2) hold in order to fully utilize the space.

Fuel is drawn from a fuel module (13) into its attached fuel module connection head (15). The type of fuel used in fuel modules (13) may vary and are sometimes referenced by the fuel type depending on an embodiment. The job of the fuel module connection head (15) is to normalize the fuel before sending it to its associated fuel supply subsystem in the control section (3). For example, one type of connection head might be capable of accepting fuel from gaseous or liquid hydrogen fuel modules (13) and normalizing either product to gaseous hydrogen at a prescribed pressure. In some embodiments, a fuel module connection head (15) compatible with a metal hydride fuel module (13) may contain the means to release hydrogen from the carrier molecule and normalize it to a prescribed pressure. Similarly, but more simply, an ammonia-compatible fuel module connection head (15) may draw liquid ammonia from an ammonia fuel module (13) and send it to the ammonia supply subsystem (23) at a prescribed pressure in a liquid state.

The hydrogen gas stream from each hydrogen-compatible fuel module connection head (15) is fed through a hose assembly, into the hydrogen fuel input manifold (29). The already pressurized gas is further compressed as necessary and fed into the hydrogen buffer storage system (30). Similarly, liquid ammonia is drawn through pumps in the fuel module connection head (15) and ammonia supply subsystem (32) through a manifold and into the ammonia buffer storage system (34).

Concurrently, intake air blowers (37) (See for example, FIG. 9), draw air from the atmosphere and force it through intake air filters (38) to remove particulates. Filtered air is fed into the intake air compressors (39) which raise the air pressure to a prescribed level before feeding it into the compressed air buffer storage system (40). The hydrogen buffer storage system (30), ammonia buffer storage system (34), and compressed air buffer storage system (40) provide the power modules (4) with an alternate supply of reactant inputs without being directly dependent on fuel modules (13). This allows power generation to continue even if fuel flow from the fuel modules (13) or air flow from the atmosphere is temporarily interrupted.

In some embodiments, the ammonia supply subsystem (23) can be fitted with an ammonia cracking subsystem (48) (FIGS. 1 and 40) for generating purified hydrogen from ammonia. The ammonia cracking subsystem (48) is located logically between the ammonia buffer storage system (34) and the hydrogen buffer storage system (30). Ammonia from the ammonia buffer storage system (34) is fed to the ammonia cracking subsystem (48) where it is dissociated into hydrogen and nitrogen. The hydrogen is purified and compressed before being fed into the hydrogen buffer storage system (30) or the hydrogen supply manifold (31). The nitrogen is vented to the environment through the exhaust subsystem (25).

Compressed hydrogen gas, compressed air, and liquid ammonia flow through pipes and control valves into their respective manifolds which distribute the reactants to the power module connection heads (6). Coolant fluid flows from the cooling subsystem (26) through pipes and control valves into the low temperature coolant fluid manifold (45) which distributes coolant fluid to power module connection heads (6). Within the power module connection heads (6), input gases are processed via compressors, humidifiers, and heat exchangers to supply hydrogen and air at the optimal temperature and pressure for the type of fuel cell and operating condition. Within the power module (4), hydrogen and air electrochemically produce electricity and water, along with excess gas and heat. A pump in the power module connection head (6) transfers pure water byproduct to the ship's freshwater system and/or to the environment. Power modules (4) requiring coolant receive low temperature coolant fluid from the low temperature coolant fluid manifold (45) and discharge high temperature coolant fluid to the high temperature coolant manifold (46). Coolant fluid is cooled by heat exchangers in the cooling unit (47). Exhaust gas (a mixture of air and water vapor) from power modules (4) is routed through the power module connection head (6) to the exhaust subsystem (25) and, in some embodiments, through a waste heat recovery system (32) before being vented to the atmosphere. Electricity from the power module (4) is routed through the power module connection head (6) to the electrical subsystem (27) and ship's electrical grid.

When a fuel module's (13) fuel supply is depleted, the fuel module connection head (15) may be repositioned to a new fuel module (13). The fuel module connection head interface (17) is disconnected from the fuel module interface (18) and the fuel-side gantry (14) is used to reposition and reattach the fuel module connection head (15) to a new fuel module (13) as described earlier. The spreader mechanism on the fuel-side gantry (14) is constrained from moving laterally by cell guides except at the top of its vertical range. This allows fuel cell connection heads (15) to be repositioned while underway and subject to rolling, pitching, and heaving motions. Initial positioning, connection, disconnection, and repositioning of fuel module connection heads (15) is controlled remotely via the master control system (28).

An example arrangement on a large container vessel might have a fuel section (2) capable of holding 200 forty-foot equivalent (feu) fuel modules (20 rows, 10 tiers) with three active fuel module Connection heads (15) and a repositioning occurring every 1-2 hours. Refueling may be accomplished by removing empty fuel modules (13) and replacing them with full ones using dockside or shipboard container cargo handling equipment. Repositioning of power module connection heads (6) is done in a similar fashion, but would typically only be done in between voyages when removing or replacing power modules (4) for servicing or making a change to the installed power.

Overall operation is fully automated and controlled by the master control system (28). Sensors automatically detect the position and type of fuel modules (13) and power modules (4) loaded into their respective sections. Using data from other ship systems as well as performance data from power modules (4), software algorithms predict optimal usage of fuel from fuel modules (13) and power modules (4) for a given voyage. As power commands are issued remotely from the bridge, the master control system (28) responds by activating power modules (4) and controlling their output.

In an exemplary operation of the system, fuel and power modules (4) are loaded into their respective sections. The master control system (28) may then be used to remotely position the fuel module connection heads (15) and power module connection heads (6) and connect them to their respective modules. After running an automated startup sequence the master control system (28) would then automatically control the overall system in response to the predicted voyage profile and power commands from the ship's operators on the bridge.

A ship operator would further use this system to optimize the ship's fuel and power needs for the situation. Several examples are provided below.

Example 1: The system may be used to flexibly exchange range for cargo capacity. A ship might be built (or retrofitted) with a large fuel section (2) or multiple fuel sections (2) to enable long range between bunkering. However, if the ship is deployed to operate on a shorter route, or a route with shorter legs between bunkering opportunities, only a fraction of the available fuel module (13) slots would be needed. The remaining slots may be used for carrying revenue generating cargo.

Example 2: The system can be used to flexibly make tradeoffs between different fuel options and/or cargo capacity. Fuel price and/or availability might vary between bunkering ports on a ship's route. A particular port might have relatively cheap hydrogen, but not ammonia based on local infrastructure. If cargo utilization is low, the operator might choose to bunker more hydrogen to fill unused cargo slots.

Example 3: The system may be reconfigured to easily change the installed power. As economic or market conditions change, it may be desirable to power a ship up or down to achieve a desired service speed. A ship configured for "slow steaming" at 18 knots may be easily powered up to support higher speeds in response to market conditions. When market conditions warrant a return to slow steaming, the power modules (4) may be removed from the vessel and used elsewhere.

Example 4: The system may be used to enable power-as-a-service business models. Operators of ships with this system installed may choose to contract with a third party to supply the required power. The third party would own the fuel modules (13) and power modules (4) and supply them to the ship operator in order to meet the contract terms (for example, X $/mwh with 50 MW max power).

A fleet operator would use this system to optimize operations across a heterogeneous fleet of vessels. Given its modularity, the same basic system can be installed as a 10 MW configuration in a 2,300 TEU feeder vessel and as a scaled up, 60 MW configuration in a 23,000 TEU ultra-large container vessel. A fleet operator who implemented this system across tens or hundreds of vessels would be able to streamline crew certification, standardize onboard procedures, and have more flexibility in crew scheduling.

Persons of ordinary skill in the art may appreciate that numerous design configurations may be possible to enjoy the functional benefits of the inventive systems. For example, the system may be configured for hydrogen fuel only and omits the ammonia-related subsystems. In another embodiment, the system may be configured for ammonia fuel only and omit the hydrogen-related subsystems. In yet another embodiment, the system may be configured with fixed fuel tanks built integral to the ship meant to supply all fuel for the ship. In this embodiment, one or more of the fuel sections (2), fuel module connection heads (15), and fuel-side gantry (14) may be omitted. In yet another embodiment, the system may be configured with fixed fuel tanks built integral to the ship meant to supply some fuel for the ship. In this configuration, the fuel section (2) may be sized smaller than in a normal configuration. In yet another embodiment, the system may be configured with fixed rather than modular fuel cells meant to provide all power to the ship. In this configuration, one or more of the power sections (1), power module connection heads (6), and power-side gantry (5) may be omitted. In yet another embodiment, the system may be configured with fixed rather than modular fuel cells meant to provide some power to the ship. In this configuration, the power section (1) may be sized smaller than in a normal configuration. In yet another embodiment, the system may include a subsystem in the control section (3) for processing a liquid organic hydrogen carrier (LOHC). Similar to the ammonia subsystem, the LOHC may be transferred through the fuel module connection heads to the LOHC subsystem. The LOHC subsystem would release the hydrogen from the LOHC, transfer the hydrogen to the hydrogen buffer storage system (30), and transfer the dehydrogenated byproduct back to an empty LOHC Fuel Module. In yet another embodiment, the fuel module connection heads may be doubled-up (or more) to enable one unit to serve multiple fuel modules, thus requiring fewer repositioning.

Thus, given the wide variety of configurations and arrangements of embodiments of the present invention the scope of the invention is reflected by the breadth of the claims below rather than narrowed by the embodiments described above.

What is claimed is:

1. A power system for producing electrical power for ship propulsion, comprising:
   a fuel module;
   a fuel module interface on a ship, wherein the fuel module interface is configured to receive the fuel module;
   a power module;
   a power module interface on the ship, wherein the power module interface is configured to receive the power module; and
   a control system on the ship and connected to the fuel module interface and to the power module interface, wherein the control system is configured to control:
   flow of a fuel from the fuel module to the power module,
   conversion of the fuel in the power module to electricity, and
   regulate a distribution of the electricity from the power module to the ship.

2. The power system of claim 1, wherein the fuel module is a size of a freight container.

3. The power system of claim 1, wherein the power module is a size of a freight container.

4. The power system of claim 1, wherein the power module includes a fuel cell array.

5. The power system of claim 1, further comprising a gantry for modularly loading or unloading the fuel module in connection to the fuel module interface.

6. The power system of claim 1, further comprising a gantry for modularly loading or unloading the power module in connection to the power module interface.

7. The power system of claim 1, wherein the control system is automated to detect a current power consumption need for the ship and adjust fuel consumption and power delivery based on the detected power consumption need.

8. The power system of claim 7, wherein the control system swaps in or swaps out the power module for another power module based on the detected power consumption need.

9. A cargo ship, comprising:
   a ship hold;
   a plurality of fuel modules stored in the ship hold;
   a plurality of fuel module interfaces in the ship hold, wherein each fuel module interface is configured to receive one of the fuel modules;
   a plurality of power modules stored in the ship hold;
   a plurality of power module interfaces on the ship, wherein each power module interface is configured to receive one of the power modules; and
   a control system on the ship and connected to the fuel module interfaces and to the power module interfaces, wherein the control system is configured to control:
   flow of a fuel from the fuel modules to the power modules, conversion of the fuel in the power modules to electricity, and regulate a distribution of the electricity from the power modules to an electrical grid of the ship.

10. The ship of claim 9, wherein the fuel modules are a size of a freight container.

11. The ship of claim 9, wherein the power modules are a size of a freight container.

12. The ship of claim 9, wherein one or more of the power modules include a fuel cell array.

13. The ship of claim 9, further comprising a gantry for modularly loading or unloading the fuel modules into connection with the fuel module interfaces.

14. The ship of claim 9, further comprising a gantry for modularly loading or unloading the power modules into connection with the power module interfaces.

15. The ship of claim 9, wherein the plurality of fuel modules are stackable in the ship hold and the plurality of fuel module interfaces are positioned to receive respective fuel modules in a stacked arrangement when the fuel modules are connected to respective fuel module interfaces.

16. The ship of claim 9, wherein the plurality of power modules are stackable in the ship hold and the plurality of power module interfaces are positioned to receive respective power modules in a stacked arrangement when the power modules are connected to respective power module interfaces.

17. The ship of claim 9, wherein the control system is automated to detect a current power consumption need for the ship and adjusts a fuel consumption from the plurality of fuel modules based on the detected power consumption need.

18. The power system of claim 17, wherein the control system connects or disconnects one of the fuel modules based on the detected power consumption need.

19. The ship of claim 9, wherein the control system is automated to detect a current power consumption need for the ship and adjusts a power delivery from the plurality of power modules based on the detected power consumption need.

20. The power system of claim 19, wherein the control system connects or disconnects one of the power modules based on the detected power consumption need.

* * * * *